Feb. 4, 1936. C. K. SHEDD ET AL 2,029,680
ATTACHMENT FOR LISTER PLANTERS
Filed Dec. 15, 1934
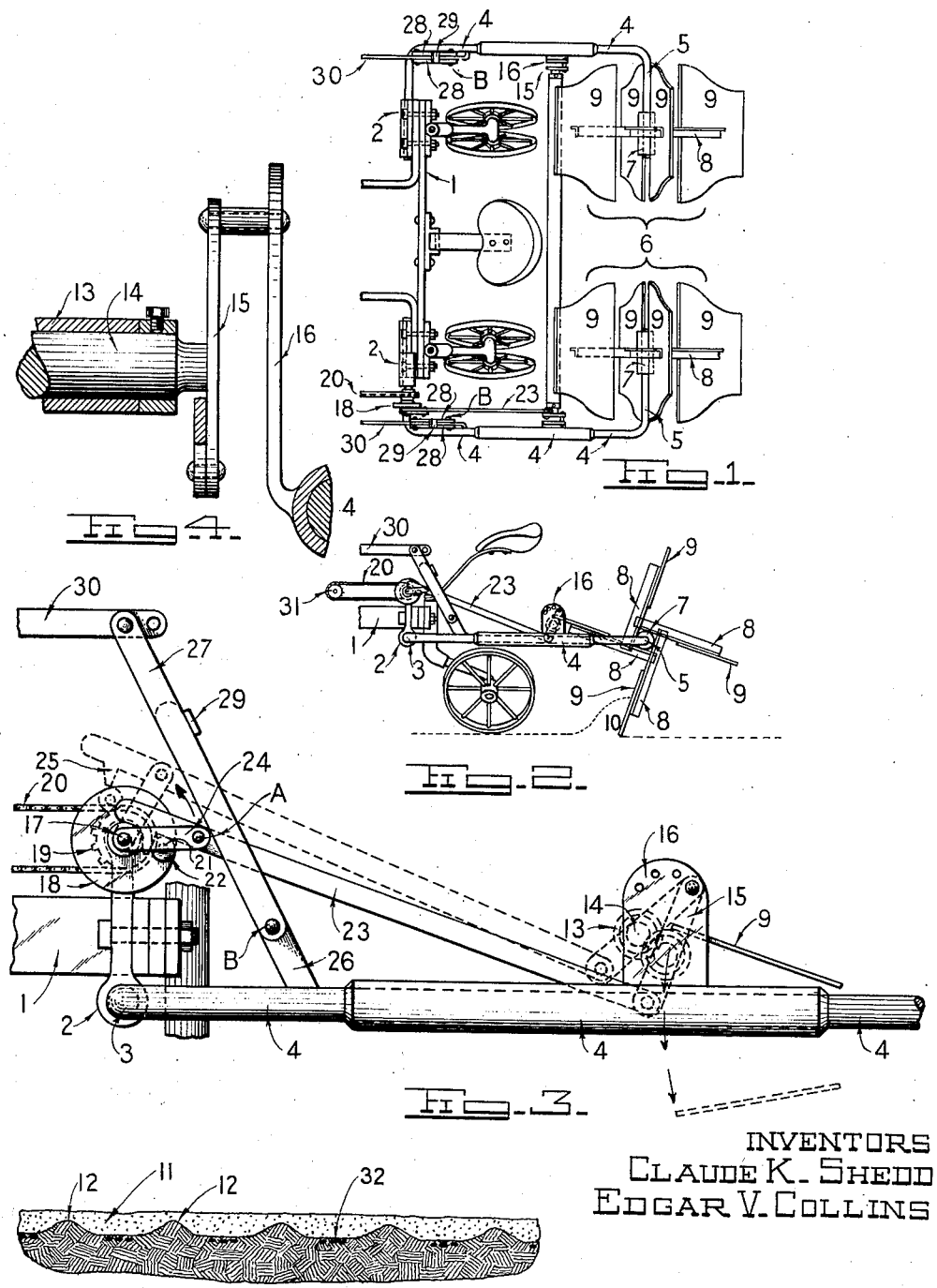
INVENTORS
CLAUDE K. SHEDD
EDGAR V. COLLINS
ATTORNEY Patented Feb. 4, 1936

2,029,680

UNITED STATES PATENT OFFICE 2,029,680

ATTACHMENT FOR LISTER PLANTERS

Claude K. Shedd and Edgar V. Collins, Ames, Iowa, dedicated to the free use of the Public Application December 15, 1934, Serial No. 757,598

3 Claims. (Cl. 111—15)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public, to take effect upon the granting of a patent to us.

Our invention which we desire to secure by Letters Patent relates to improvements in farm implements, and more particularly to that type of implement known as a lister planter which is used to plant corn, cotton, and other crops in furrows so that the soil can be cultivated during the growth of the crop. It is the object of our invention to provide an attachment for producing transverse dams at suitable intervals in the furrows formed by a lister planter, thus forming, between the dams, basins which will contain rainwater, until it is absorbed by the soil.

In order to facilitate the description of our invention so as to make this application independent of any existing patents more or less remotely resembling our invention, we will describe briefly the method pursued in planting row crops with a lister planter. The lister planter now in common use comprises a furrow opening member, which is a plow having a double moldboard. The dirt thrown to either side from the furrows forms ridges between the furrows. The seed is planted in the bottom of the furrow by a seed planting mechanism, which is part of the lister planter. Cultivation during growth of the crop works dirt back from the ridges into the furrows so that after the last cultivation is completed, the ground surface is again practically level.

It has been found that when crops are planted by the use of lister planters the water precipitated during heavy rains flows freely in the furrows. This causes the following difficulties:

1. Seed, small plants and soil are washed out of the furrow bottoms on slopes in the land surface.

2. Water and eroded soil accumulate and stand in the furrows at low points in the land surface thus covering up or drowning the crop.

3. On rolling lands water needed in the soil for plant growth is lost by run-off and a great deal of the richest part of the soil is carried away with this run-off water.

It is the object of our invention to provide an attachment for a lister planter of such a nature that a lister planter provided with our attachment, besides forming furrows and planting seed in the bottom of the furrows in the usual manner, will also form transverse dams at suitable intervals in these furrows, so that rainwater will be retained in the basins between the dams until it is absorbed by the soil.

The difficulties heretofore encountered by the use of lister planters will thus be eliminated by the use of our invention.

With the foregoing, and other objects, as will hereinafter appear, our invention resides in an attachment for a lister planter of commonly used construction. For this purpose reference will be had to the accompanying drawing, in which the preferred embodiment of our invention has been illustrated, and in which:

Figure 1 is a top plan view of the attachment;

Figure 2 is a side elevation of the attachment;

Figure 3 is an enlarged side elevation of the forward portion of the attachment;

Figure 4 is a transverse vertical section of a portion of our attachment;

Figure 5 is a longitudinal section of a furrow showing the preferred relative location of seed and dams.

Similar numerals refer to similar parts throughout the several views.

The attachment illustrated in the drawing is adapted to be attached to a two-row implement, but this size of implement as to number of rows must be considered as illustrative only, and not limiting our invention to a two-row implement, since our invention may be practiced equally as well with a single-row, or with a multiple-row implement.

Our attachment is adapted to be secured to the rear of a lister planter frame 1. A bearing 2 is positioned in the rear of and above the furrow forming member of the planter with its axial line horizontal and extending transversely of the implement. A short shaft 3 is journalled in the bearing 2 and extends laterally with respect to the implement to a point outside of the outer edge of the furrow opened by the implement. An arm 4 is rigidly secured to the outer end of 3 and at right angles to shaft 3 and, in operation extends rearwardly in a generally horizontal position. An axle 5 is rigidly secured to the rearward end of arm 4, at right angles thereto and extending parallel to shaft 2. A rotary paddle wheel scraper 6 is journalled and rotates freely upon axle 5 and is secured, by suitable means, not shown, against endwise movement upon the same. Paddle wheel scraper 6 comprises a hub 7, four equally spaced radial spokes 8 rigidly secured to hub by suitable means, not shown, and scraper blades 9 rigidly secured to each of the spokes 8, and extending parallel to axle 5. Scraper blades 9 are shaped to fit the bottom and sides of the furrow formed by the plow of lister planter.

By this novel construction and arrangement of parts, the rearward end of the arm 4 carrying axle 5 is free to move up and down so that the paddle wheel scraper 6 will automatically adjust its position to uneven ground surface. This construction also permits the paddle wheel scrapers 6 to be raised for purposes of transportation, by means hereinafter described.

As the lister planter moves forward, the scraping action of the scraper blades 9 in the furrow tends to revolve the paddle wheel scraper 6 upon axle 5. The paddle wheel scraper 6 is held stationary at such a point in its rotation that one of the scraper blades 9 is held in a vertical position, so as to scrape the dirt 10 from the sides and bottom of the furrow 11. At predetermined intervals the paddle wheel scraper 6 is released and allowed to revolve one-fourth revolution and is again held stationary with the next succeeding scraper blade 9 in scraping position. The dirt 10 accumulated by the scraper blade 9 and left in the furrow 11, as the paddle wheel scraper 6 rolls forward over it, forms a dam 12 extending transversely of the furrow 11.

The paddle wheel scraper 6 is held stationary by a horizontal hollow roller 13, which extends transversely of the planter in such a position as to engage the outer end of the forwardly extending scraper blade 9 of the paddle wheel scraper 6. Roller 13 is rotatably mounted on roller shaft 14 which extends entirely through roller 13 and projects at each end beyond the end of the roller 13. The projecting ends of shaft 14 are rigidly secured, by welding or other suitable means, to the lower ends of parallel levers 15. The upper ends of levers 15 are pivotally secured to brackets 16, which are rigidly secured, by welding or other suitable means, to lever arms 4. The weight of roller 13 and shaft 14 tend to cause levers 15 to hang in a vertical position from their pivots and hold roller 13 in position to engage the outer end of scraper blade 9 and prevent paddle wheel scraper 6 from rotating.

At predetermined intervals the levers 15 are swung forward momentarily, carrying roller 13 outward beyond the circumference of paddle wheel scraper 6 releasing the scraper blade 9 and allowing the paddle wheel scraper 6 to rotate. The roller 13 is quickly returned to its normal position in time to engage the next succeeding scraper blade 9, permitting paddle wheel scraper 6 to rotate only one fourth revolution.

The means by which levers 15 are swung forward are as follows: A horizontal stud 17 is welded, or otherwise suitably secured, to the upper part of bearing 2 and extends transversely outward therefrom. A disc 18, having on each side a concentric hub, is rotatively mounted on stud 17 and is secured, by suitable means not shown, against endwise movement on the same. A sprocket wheel 19 is concentrically mounted on the inner hub of the disc 18 and is secured to the same by any suitable means. Disc 18 is rotated by means of an endless chain 20, driven from a sprocket wheel 31 adapted to be mounted on a rotating shaft of the planter, which operates the seed depositing mechanism. Disc 18 is provided on its outer face with an eccentrically mounted pin 21. A roller 22 is rotatably mounted on pin 21 and is secured, by any suitable means against endwise movement upon the same. A trip bar 23 is pivotally connected by any suitable means, at its rear end, to the lower end of one of the levers 15 and extends forwardly so that its forward end, when in its lowest position, rests upon the outer hub of disc 18. One end of a link 24 is rotatably mounted on the outer end of stud 17, and is secured by any suitable means against endwise movement on the stud 17. The other end of link 24 is pivotally connected at a point designated by the letter "A" to the trip bar 23. A projection or dog 25 is secured, by welding or other suitable means, to the lower edge of trip bar 23 at such a point on the same that, as the disc 18 is rotated, roller 22 on pin 21 will contact with the rear face of dog 25 at the same time that it contacts with the lower edge of trip bar 23. Further rotation of disc 18 will result in the lifting and drawing forward of the forward end of trip bar 23 and the swinging forward of the lower end of lever 15, and with it the roller shaft 14 and hollow roller 13. This movement of roller 13 carries it out beyond the circumference of the paddle wheel scraper 6, releasing it and permitting it to rotate. A slight further rotation of disc 18 beyond the point at which paddle wheel scraper 6 is released causes the dog 25 to be carried out of engagement with the roller 22 on pin 21 due to the greater radius of the arc traversed by the point "A" on trip bar 23 and the greater angularity of trip bar 23. The weight of the trip bar 23 causes it to drop back to its initial position as soon as roller 22 disengages dog 25, thereby also returning hollow roller 13 into position to engage the scraper blade 9 next succeeding the blade just released.

When the implement is in operation, the paddle wheel scraper 6 is released and allowed to turn one fourth revolution for each revolution of the disc 18. By replacing sprocket wheel 19 with another of different size, it is possible to change the speed of rotation of disc 18 and thus change the frequency of formation of dams 12 in the furrows 11 without making any change in the seeding mechanism of the planter.

The paddle wheel scrapers 6 may be lifted and held clear of the ground by means described as follows: A lever 26 is secured, by welding or other suitable means, at its lower end to lever arm 4 at a point near to the forward end of the lever arm 4 and extends upward therefrom. A link 27 is pivotally connected to the lever 26 at a point indicated by reference letter "B". The link 27 comprises two link bars 28 one each side of the lever 26 joined near their upper ends by a short cross bar 29 which is welded or otherwise rigidly secured to the back edges of the link bars 28. By this construction the link 27 can pivot rearwardly but not forwardly from the center line of the lever 26. A lifting bar 30 is pivotally connected to the top part of the link 27. The forward end of the lifting bar 30 is operatively connected with the plow lifting mechanism of the lister planter in such manner that the lifting bar 30 will be moved forwardly and raise scrapers 6 from the ground when the lifting mechanism is operated to raise the plow bottoms, and will lower scrapers 6 when plow bottoms are lowered.

We prefer to employ our invention in connection with lister planters adapted to deposit seed in hills, at regularly spaced intervals, and with the releasing mechanism of the attachment so timed as to form dams in the furrow at similarly spaced intervals and located in the spaces between the planted hills; as shown in Figure 5 in which dams 12 are shown in furrow 11 intermediate between planted hills of seed 32.

Our invention may also be practiced with the releasing mechanism timed to form dams directly over the planted hills, at intermediate positions, or at intervals differing from the intervals between hills. It may be further practiced with lister planters adapted to plant seed in continuous rows.

Having described our invention, what we claim as new is:

1. An attachment for a lister planter, comprising a bearing adapted to be secured to the rear portion of the lister planter frame and substantially in rear of a plow of the lister planter and disposed with its axis horizontal and extending transversely of the planter, a shaft journalled in said bearing, a freely swinging arm secured to said shaft and extending substantially rearwardly therefrom, an axle secured to the rear end of said arm and extending parallel to said shaft, a multi-blade rotary scraper journalled upon said axle and having a hub with a plurality of scraper blades extending radially therefrom and adapted to scrape soil from the sides and bottom of a furrow formed by the plow of said planter, a bracket rigidly secured to said arm at an intermediate point thereon and extending substantially upwardly therefrom, a pendant lever pivotally connected to the upper portion of said bracket and depending therefrom, a second shaft rigidly secured to the lower end of said pendant lever and extending parallel to said axle, a hollow roller mounted and rotating freely on said second shaft and suitably secured against endwise movement thereon and adapted to engage a blade of said rotary scraper, a stud mounted above and parallel to said bearing and secured thereto, a disc rotatively mounted on said stud and having on each side concentric hubs, a sprocket wheel mounted on and secured to a hub of said disc and driven by an endless chain, a pin mounted eccentrically on the outer face of said disc, a second roller rotatively mounted on said pin and suitably secured against endwise movement thereon, a trip bar pivotally connected at its rearward end to the lower end of said pendant lever and extending forwardly therefrom, a link pivotally connected at its inner end to said stud and pivotally connected at its outer end to said trip bar at a point substantially intermediate between the mid-length and the forward end thereof, a dog secured to the lower edge of said trip bar and adapted to be intermittently engaged and suddenly released by said second roller, an upright lever secured at its lower end to the forward portion of said arm, a second link pivotally connected at its lower end to said upright lever and having on its rearward edge a cross bar adapted to engage the rear edge of said upright lever, a lifting bar pivotally connected at its rear end to the upper end of said second link and operatively connected at its forward end to an operative member of the plow lifting mechanism of the planter.

2. An attachment for a lister planter, comprising a bearing adapted to be secured to the rear portion of the lister planter frame and substantially in rear of a plow of the lister planter and disposed with its axis horizontal and extending transversely of the planter, a shaft journalled in said bearing, a freely swinging arm secured to said shaft and extending substantially rearwardly therefrom, an axle secured to the rear end of said arm and extending parallel to said shaft, a multi-blade rotary scraper journalled upon said axle and having a hub with a plurality of scraper blades extending radially therefrom and adapted to scrape soil from the sides and bottom of a furrow formed by the plow of said planter, a bracket rigidly secured to said arm at an intermediate point thereon and extending substantially upwardly therefrom, a pendant lever pivotally connected to the upper portion of said bracket and depending therefrom, a second shaft rigidly secured to the lower end of said pendant lever and extending parallel to said axle, a hollow roller mounted and rotating freely on said second shaft and suitably secured against endwise movement thereon and adapted to engage a blade of said rotary scraper, a stud mounted above and parallel to said bearing and secured thereto, a disc rotatively mounted on said stud and having on each side concentric hubs, a sprocket wheel mounted on and secured to a hub of said disc and driven by an endless chain, a pin mounted eccentrically on the outer face of said disc, a second roller rotatively mounted on said pin and suitably secured against endwise movement thereon, a trip bar pivotally connected at its rearward end to the lower end of said pendant lever and extending forwardly therefrom, a link pivotally connected at its inner end to said stud and pivotally connected at its outer end to said trip bar at a point substantially intermediate between the mid-length and the forward end thereof, and a dog secured to the lower edge of said trip bar and adapted to be intermittently engaged and suddenly released by said second roller.

3. An attachment for a lister planter, comprising a bearing adapted to be secured to the rear portion of the lister planter frame and substantially in rear of a plow of the lister planter and disposed with its axis horizontal and extending transversely of the planter, a shaft journalled in said bearing, a freely swinging arm secured to said shaft and extending substantially rearwardly therefrom, an axle secured to the rear end of said arm and extending parallel to said shaft, a multi-blade rotary scraper journalled upon said axle and having a hub with a plurality of scraper blades extending radially therefrom and adapted to scrape soil from the sides and bottom of a furrow formed by the plow of said planter, a bracket rigidly secured to said arm at an intermediate point thereon and extending substantially upwardly therefrom, a pendant lever pivotally connected to the upper portion of said bracket and depending therefrom, a second shaft rigidly secured to the lower end of said pendant lever and extending parallel to said axle, a hollow roller mounted and rotating freely on said second shaft and suitably secured against endwise movement thereon and adapted to engage a blade of said rotary scraper, and means comprising a trip bar, and a rotating disc driven by said lister planter, for periodically moving said hollow roller forward to intermittently release said rotary scraper.

CLAUDE K. SHEDD.
EDGAR V. COLLINS.